United States Patent
Kopera et al.

(10) Patent No.: US 6,315,673 B1
(45) Date of Patent: Nov. 13, 2001

(54) MOTION SIMULATOR FOR A VIDEO GAME

(75) Inventors: Thomas M. Kopera, Villa Park;
Thomas P. Anderson, Chicago;
Patrick E. Goschy, Carol Stream;
Christopher T. Bobrowski, Chicago,
all of IL (US)

(73) Assignee: Midway Amusement Games LLC, Chicago, IL (US)

( * ) Notice: Subject to any disclaimer, the term of this patent is extended or adjusted under 35 U.S.C. 154(b) by 0 days.

(21) Appl. No.: 09/412,960

(22) Filed: Oct. 5, 1999

(51) Int. Cl.[7] .................................................. A63G 31/16
(52) U.S. Cl. .............................. 472/60; 472/130; 434/55
(58) Field of Search ................................... 472/59, 60, 61,
472/130; 434/55, 59, 62

(56) References Cited

U.S. PATENT DOCUMENTS

| | | |
|---|---|---|
| D. 334,487 | 4/1993 | Perry . |
| D. 337,216 | 7/1993 | Boyd . |
| D. 404,209 | 1/1999 | Hunsaker . |
| 4,030,208 | 6/1977 | Carver et al. . |
| 4,142,722 | 3/1979 | Romano et al. . |
| 4,418,911 | 12/1983 | Bowers et al. . |
| 4,527,980 | 7/1985 | Miller . |
| 4,582,490 | 4/1986 | Foerst . |
| 4,584,896 * | 4/1986 | Letovsky .............................. 434/55 X |
| 4,657,257 | 4/1987 | Lubeck . |
| 4,705,274 | 11/1987 | Lubeck . |
| 4,960,117 | 10/1990 | Moncrief et al. . |
| 5,195,746 | 3/1993 | Boyd et al. . |
| 5,368,484 | 11/1994 | Copperman et al. . |
| 5,419,613 | 5/1995 | Wedeking . |
| 5,437,453 | 8/1995 | Hineman . |
| 5,515,078 | 5/1996 | Greschler et al. . |
| 5,533,899 | 6/1996 | Young . |
| 5,573,320 | 11/1996 | Shearer . |
| 5,618,178 | 4/1997 | Copperman et al. . |
| 5,669,818 | 9/1997 | Thorner et al. . |
| 5,684,722 | 11/1997 | Thorner et al. . |
| 5,695,406 * | 12/1997 | Park ....................................... 472/61 |
| 5,807,177 | 9/1998 | Takemoto et al. . |
| 5,901,936 | 5/1999 | Bieg . |
| 5,911,634 | 6/1999 | Nidata et al. . |
| 5,915,786 | 6/1999 | Kotani . |
| 5,919,045 | 7/1999 | Tagge et al. . |
| 5,997,303 * | 12/1999 | Yoshida et al. ......................... 434/62 |
| 6,139,324 * | 10/2000 | Roy et al. .............................. 434/55 |

OTHER PUBLICATIONS

Description of Ronbotics Machine with Photographs (4 sheets), Ronbotics Corp, Sterling, Virginia, date unknown.

Article; "The Design of a Low Cost Motion Chair for Video Games and MPEG Video Playback," Huang et al, IEEE Inc., New York, vol. 42(4), Nov. 1, 1996, pp. 991–997.

* cited by examiner

*Primary Examiner*—Kien T. Nguyen
(74) *Attorney, Agent, or Firm*—Jenkens & Gilchrist, PCC (57) ABSTRACT

In one aspect of the present invention, there is provided a motion simulator for a video game. The motion simulator includes a base and a platform supported on the base. The platform has first and second sides. First and second motors drive respective first and second shafts. First and second cams are mounted to the respective first and second shafts. First and second cam followers are connected to the platform proximate the respective first and second sides. The first and second cam followers rest on the respective first and second cams such that rotation of either the first or second shaft causes vertical movement of the platform.

42 Claims, 10 Drawing Sheets

MOTION SIMULATOR FOR A VIDEO GAME

FIELD OF THE INVENTION

The present invention relates generally to video games and, more particularly, to an inexpensive motion simulator that adds realism to a video game experience.

BACKGROUND OF THE INVENTION

Traditionally, video games are played by standing or sitting at a stationary video game machine that generally includes a video display and controls. The controls may include joysticks, buttons, levers and/or pedals. Some video game machines include driving games where a player sits in a driver's seat, steers a steering wheel, shifts gears, and manipulates driving pedals to simulate driving a vehicle appearing on the video display. Typically, the video display is stationary with respect to the seated player. Recently, moveable video game seats have been introduced in an attempt to simulate movements of the vehicle appearing on the video display, thereby adding a degree of realism to the video game experience. These moveable seats, however, are typically moved by hydraulics and thus are costly to mass produce. Although some other seats are moved by levers and therefore are less costly to produce, such seats are less versatile in that only a few basic movements can be effectuated. With such limited versatility, the seats poorly simulate vehicular movements appearing on the video display.

Accordingly, there is a need for an inexpensive motion simulator that adds a high degree of realism to a video game experience.

SUMMARY OF THE INVENTION

In one aspect of the present invention, there is provided a motion simulator for a video game. The motion simulator includes a base and a platform supported on the base. The platform has first and second sides. First and second motors drive respective first and second shafts. First and second cams are mounted to the respective first and second shafts. First and second cam followers are connected to the platform proximate the respective first and second sides. The first and second cam followers rest on the respective first and second cams such that rotation of either the first or second shaft causes vertical movement of the platform.

BRIEF DESCRIPTION OF THE DRAWINGS

Other objects and advantages of the invention will become apparent upon reading the following detailed description and upon reference to the accompanying drawings, in which.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Figure 1:
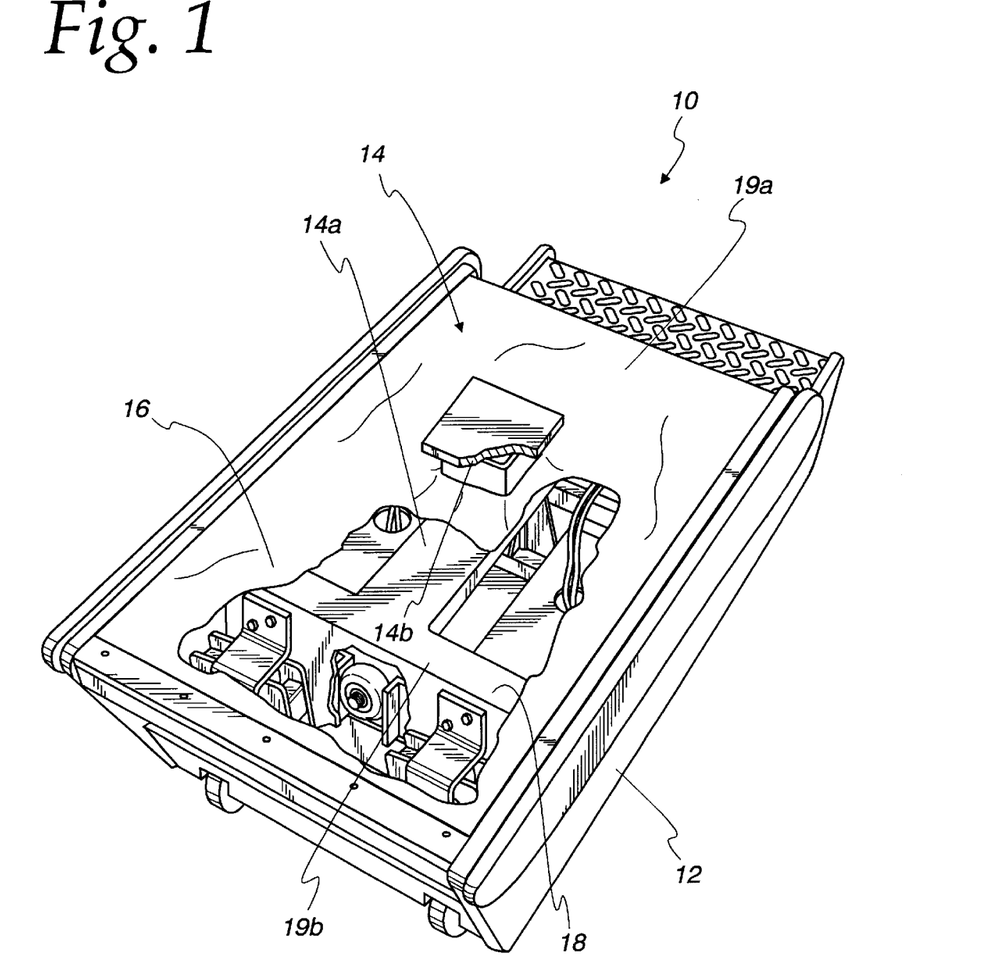
FIG. 1 is a perspective view of a motion simulator for a video game according to the present invention.
Figure 2:
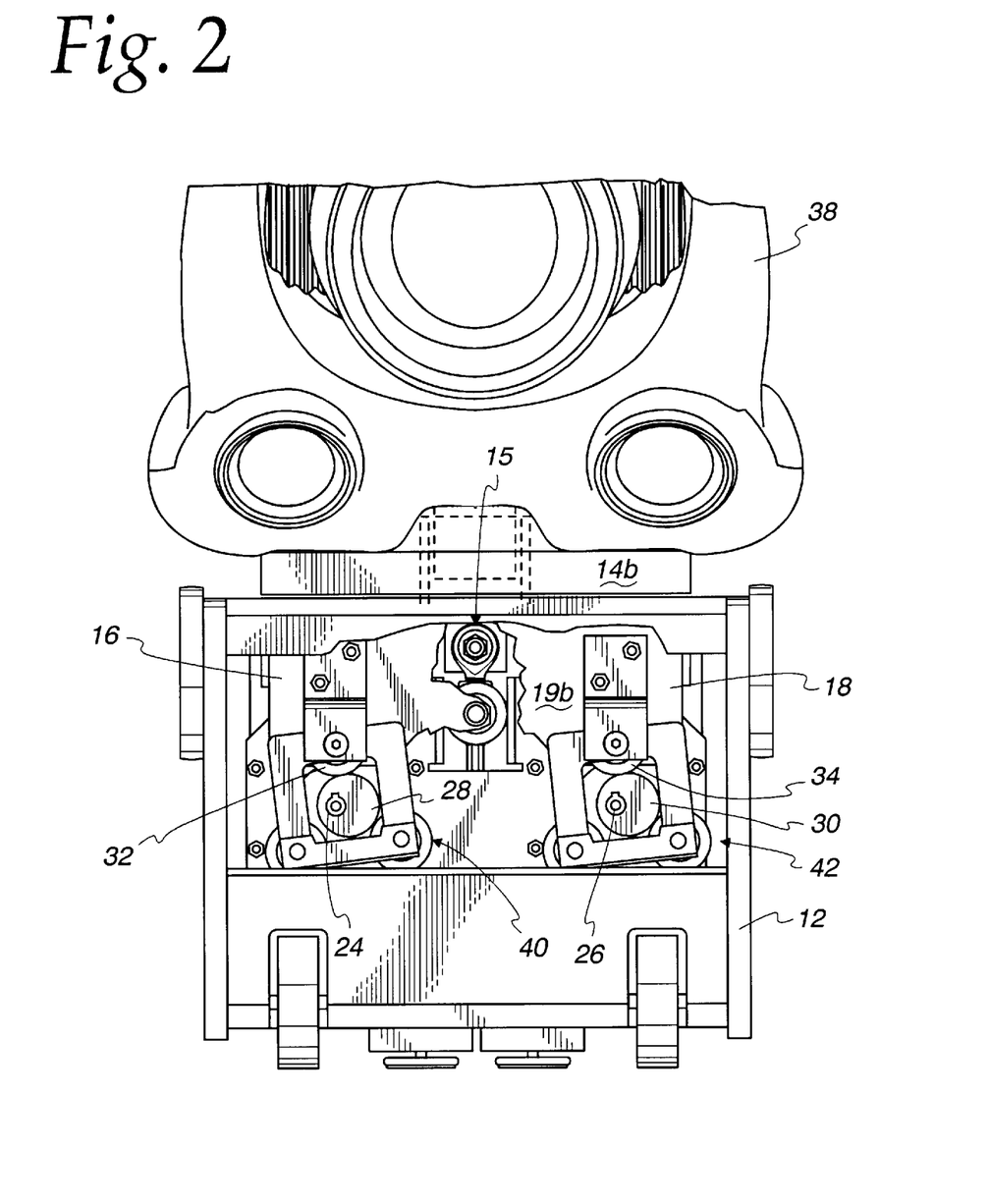
FIG. 2 is a rear view of the motion simulator of FIG. 1.
Figure 3:
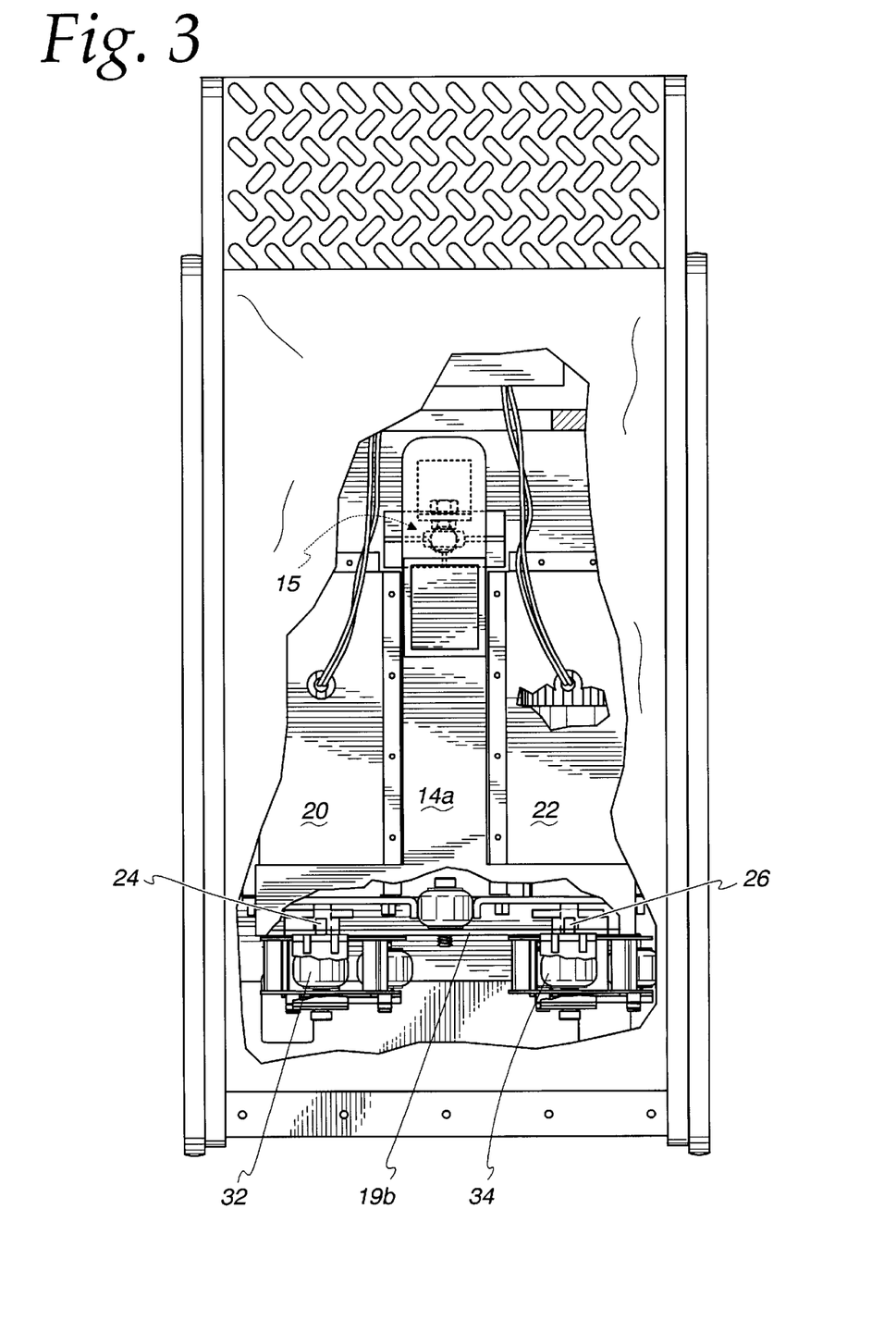
FIG. 3 is a top view of the motion simulator of FIG. 1.
Figure 4:
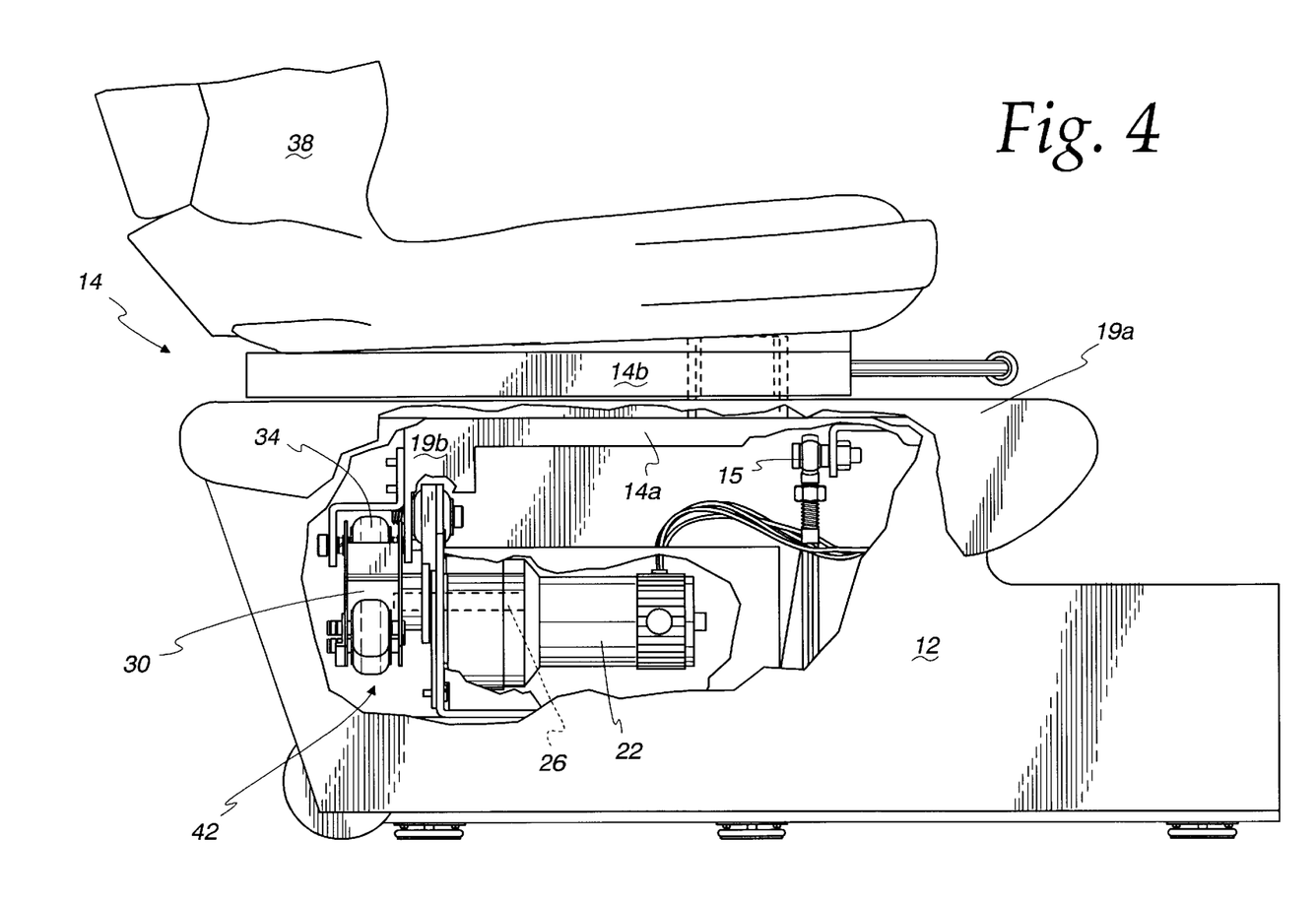
FIG. 4 is a side view of the motion simulator of FIG. 1.
Figure 11A:
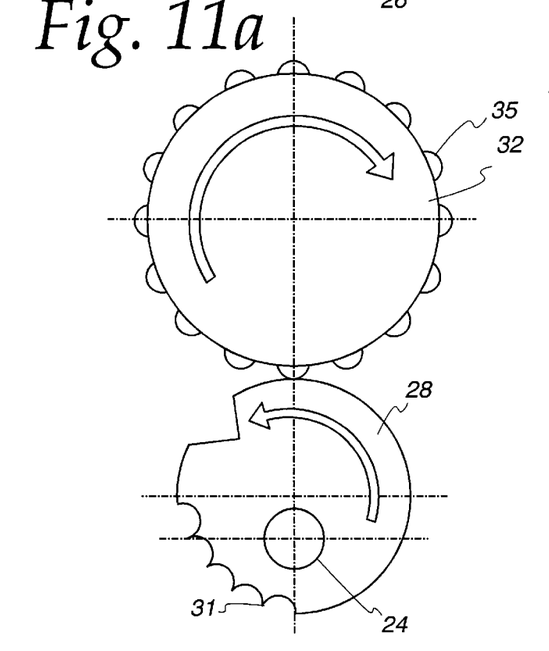
Figure 11C:
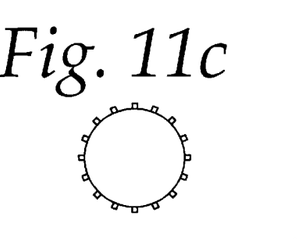
Figure 11D:
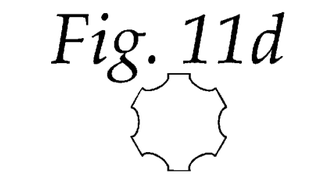
Figure 11E:
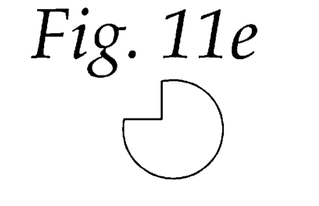

Turning now to the drawings and referring initially to FIG. 1, one embodiment of the present invention is shown to include a motion simulator 10 for use with a video game. The motion simulator 10 includes a base 12 and a platform 14 supported on the base 12. The platform 14 includes a first side 16, a second side 18, a front 19a, and a back 19b. In one embodiment, the platform 14 includes two sections, an interior section 14a and an exterior section 14b. Those skilled in the art will appreciate that the platform 14 may be comprised of one unitary section or several sections depending on how the motion simulator 10 is constructed. As shown in FIG. 4, the platform 14 is supported on the base 12 by a coupling 15, such as, for example, a servo coupling, a universal coupling, a ball and socket coupling, a flexible coupling, etc. As shown in FIGS. 2–4, the coupling 15 is preferably located near the front 19a of the platform 14, approximately halfway between the sides 16, 18. First and second motors 20, 22 drive respective first and second shafts 24, 26, as shown in FIG. 3. In one embodiment, the first and second motors 20, 22 are DC gear motors having an output speed of approximately 60 revolutions per minute. Alternatively, any type of electric motor could be used. First and second cams 28, 30 are mounted to the respective first and second shafts 24, 26, as illustrated in FIG. 2. The first and second cams 28, 30 are eccentric cams (i.e., the respective shafts 24, 26 connect to each respective cam 28 and 30 in an off-center fashion, as best shown in FIGS. 2 and 11a.) In one embodiment, the cams 28, 30 are made from a metal alloy.

Figure 7A:
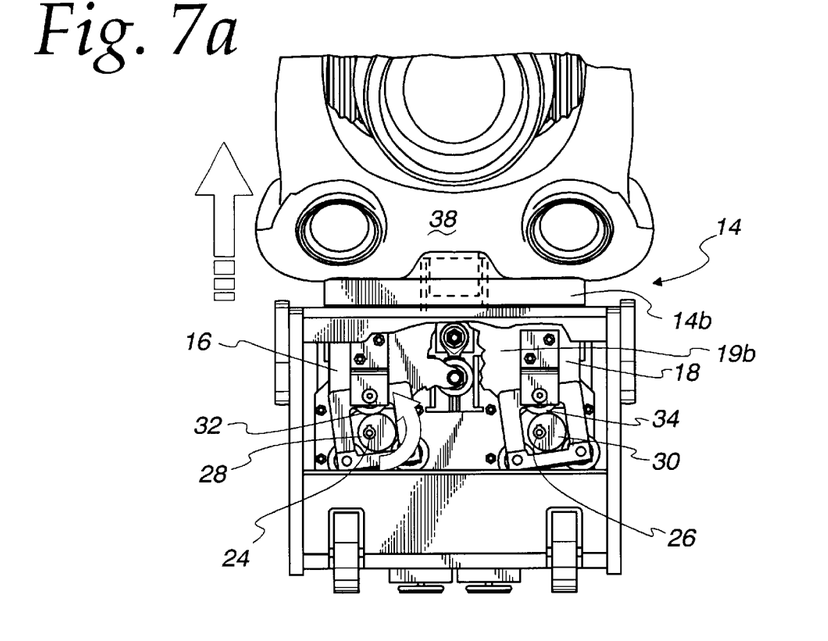
FIGS. 7a–7c are rear views showing how the cam/cam follower arrangement moves a platform of the motion simulator of FIG. 1.

As shown in FIGS. 4 and 7a, first and second cam followers 32, 34 are connected to the back 19b of the platform 14 proximate the respective first and second sides 16, 18. The cam followers 32, 34 are connected to the platform 14 by fasteners such as nails, screws, bolts, lugs, etc. The first and second cam followers 32, 34 comprise respective first and second rollers, as shown in FIG. 4. In one embodiment, these rollers are made from soft urethane rubber. The first and second cam followers 32, 34 rest on the respective first and second cams 28, 30 such that rotation of either the first or second shaft 24, 26 causes the respective eccentric cam to rotate, thus imparting vertical movement to the platform 14.

Figure 6:
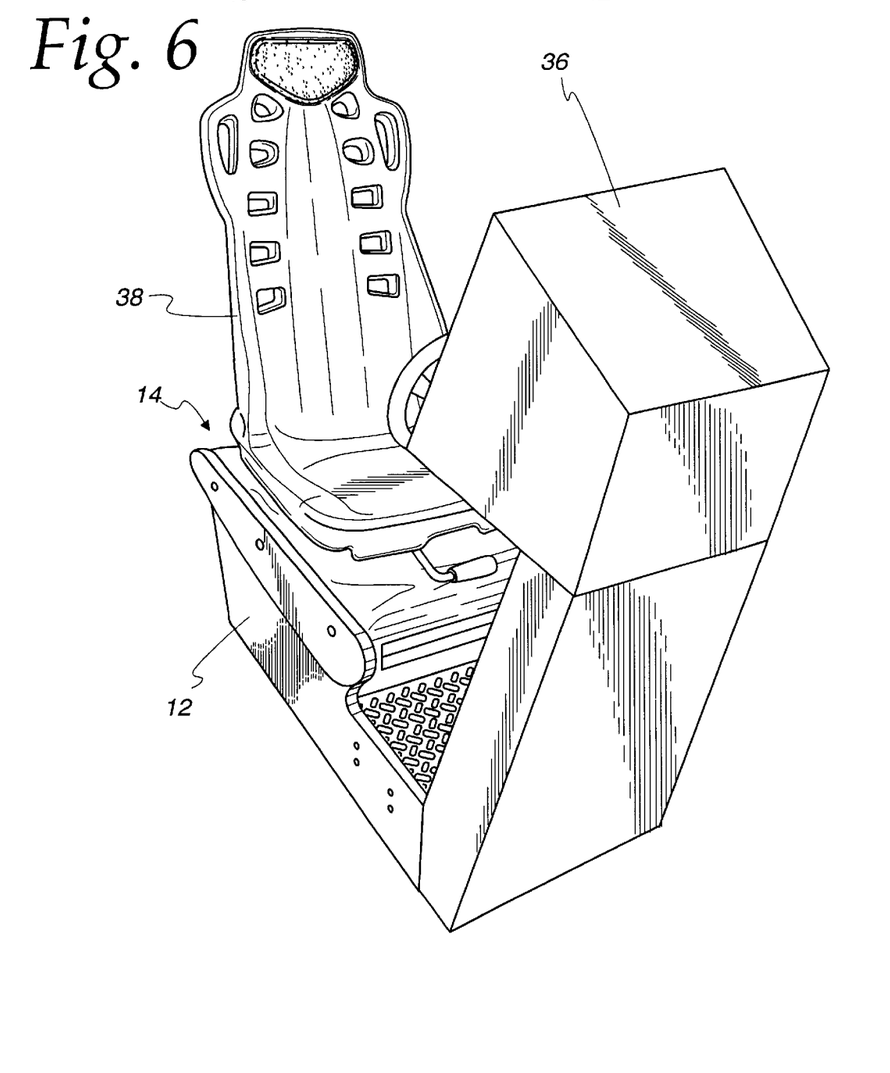
FIG. 6 is a perspective view showing the motion simulator of FIG. 1 in conjunction with a stationary video display.

As shown in FIG. 6, the seat 38 is mounted to the platform 14. In some embodiments, a video display 36 is provided for allowing a seated player to view a video game scene. In one embodiment, the video display 36 is stationary relative to the platform 14. Thus, the platform 14, with the seat 38 mounted thereon, is subjected to motion while the base 12 and video display 36 remain stationary.

Figure 7B:
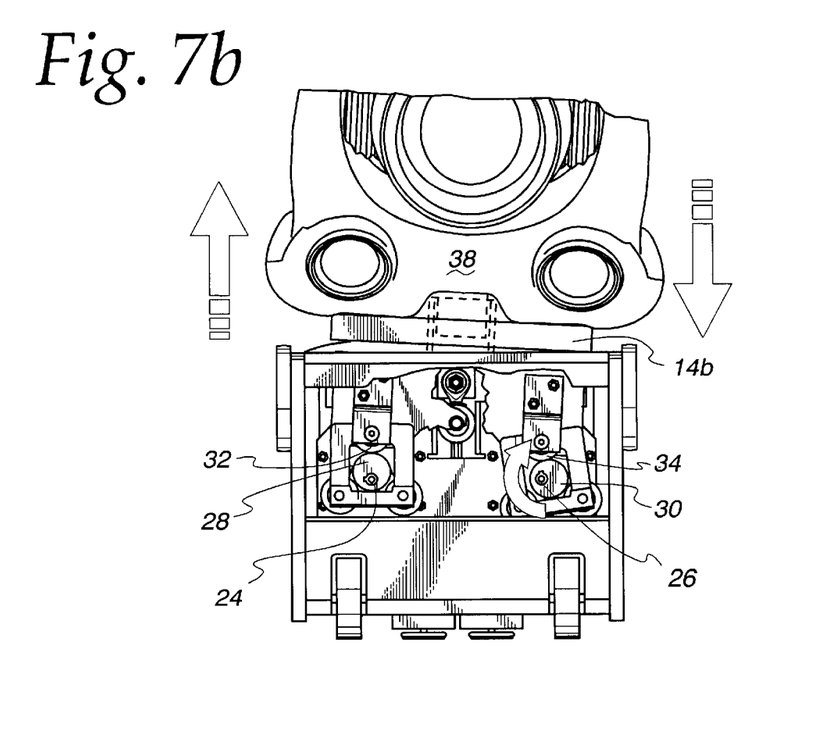
Figure 7C:
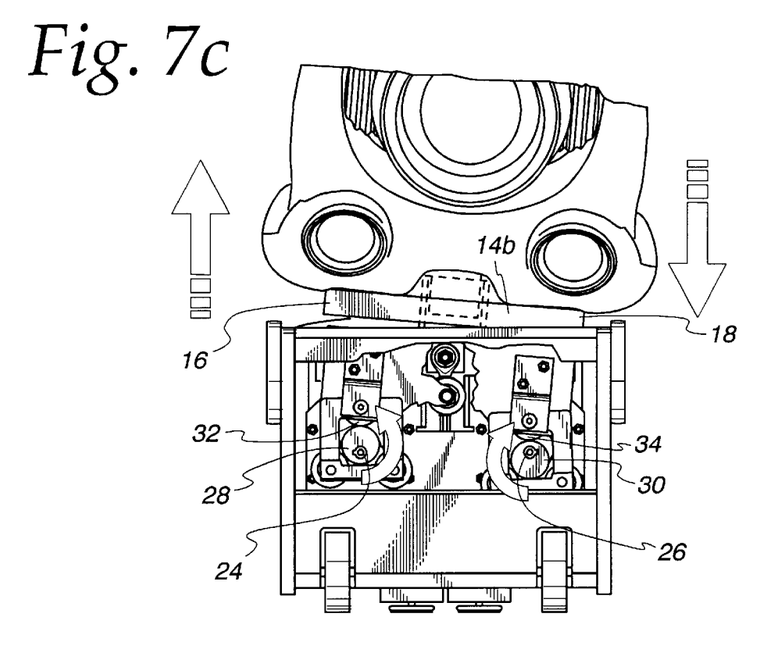

The motion simulator 10 operates by selectively rotating one or both of the first and second shafts 24, 26 by energizing their respective first and second motors 20, 22. For simplicity, in the following example, only the first shaft 24 will be rotated. However, in practice, one or both of the shafts will be selectively rotated to simulate different video game effects, as described below. Rotation of the first shaft 24 causes the first cam 28 to undergo a corresponding amount of angular rotation. As shown in FIGS. 7a, b, as the cam 28 rotates counterclockwise, the cam follower 32 is moved upward vertically. This causes the platform sections 14a,b to tilt to the right relative to its initial horizontal position, shown in FIG. 7a. To make the platform sections 14a,b tilt further to the right, the second cam 30 is rotated clockwise to the position shown in FIG. 7c. The abutting relationship between the first and second cam followers 32, 34 and the respective first and second cams 28, 30 allows rotation of the respective cams 28, 30 to impart vertical movement to the cam followers 32, 34 thus imparting vertical movement to the platform sections 14a,b.

Figure 8A:
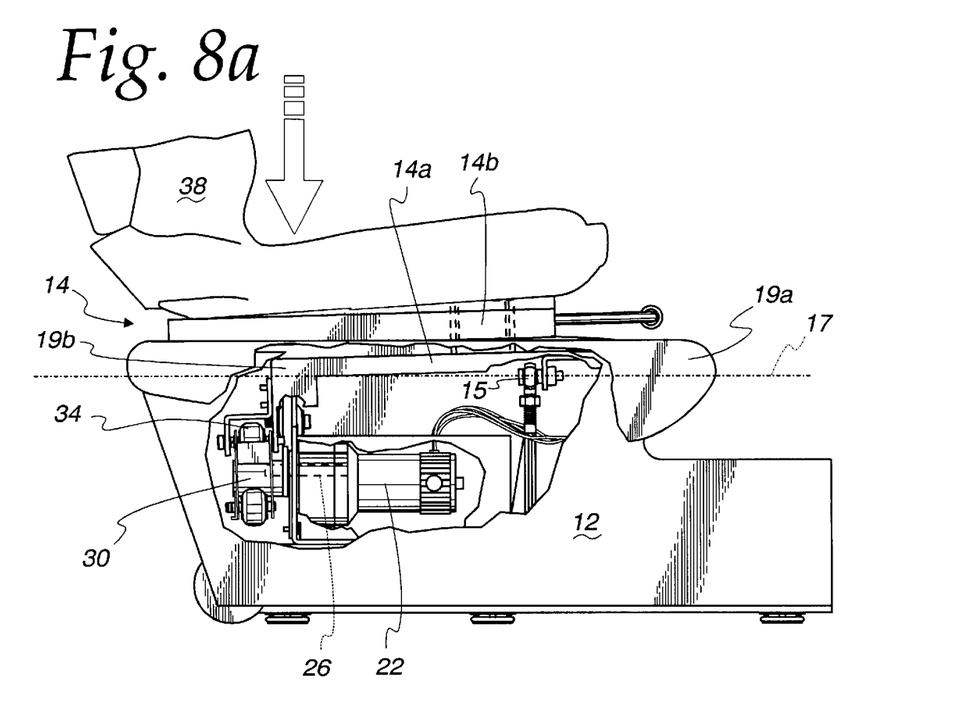
FIGS. 8a–8b are side views of the motion simulator of FIG. 1 showing the platform in two different pitch positions.
Figure 8B:
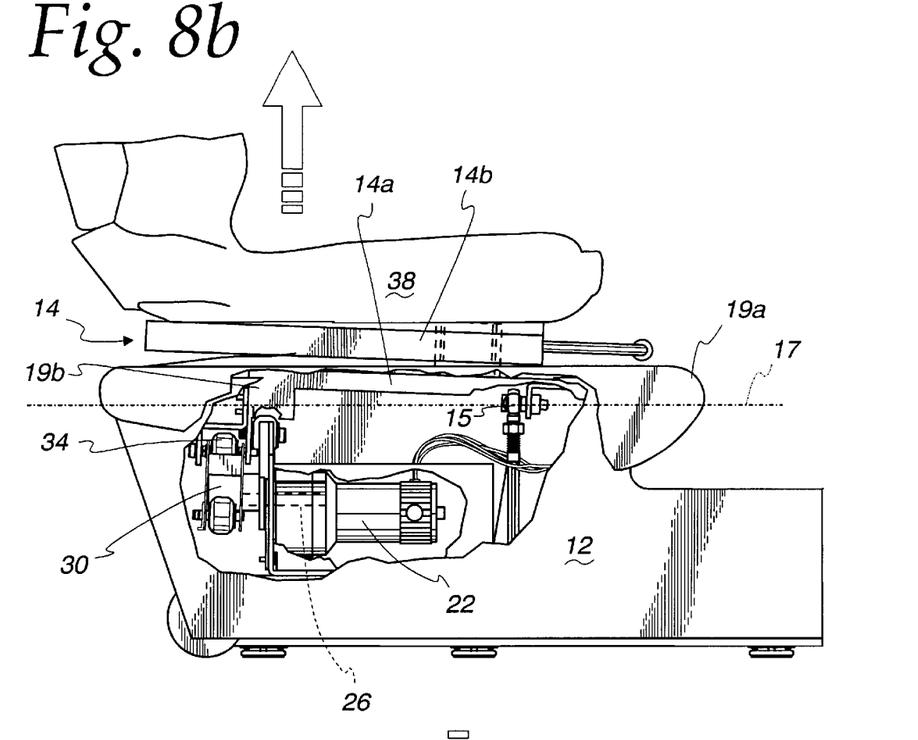
Figure 9A:
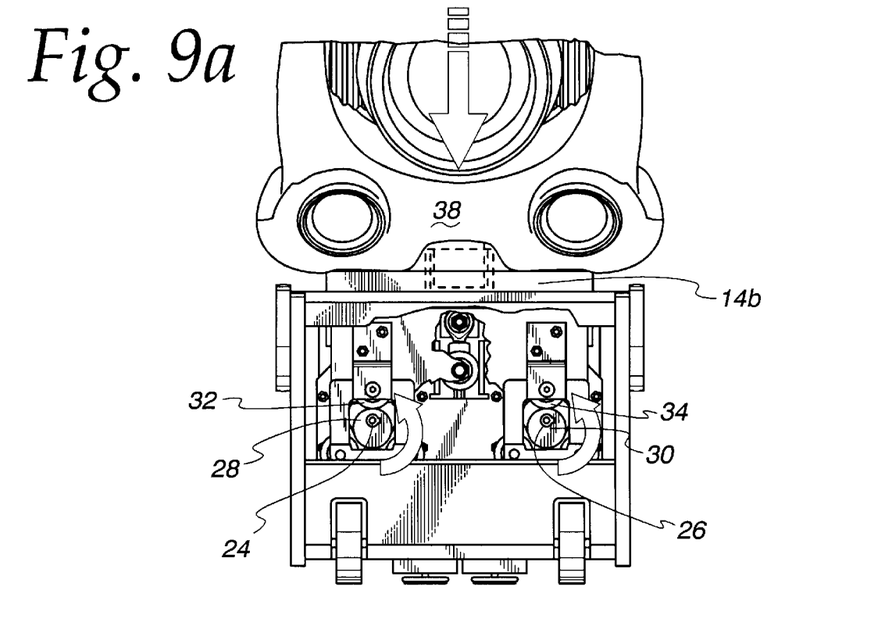
FIGS. 9a–9b are rear views of the cam/cam follower arrangement the two different pitch positions shown in FIGS. 8a–8b.
Figure 9B:
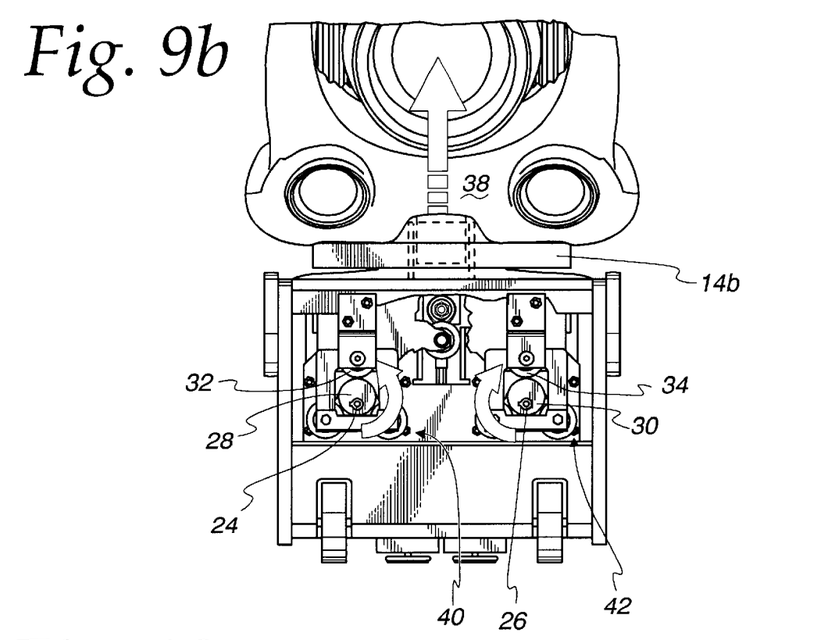

The cams and cam followers produce two types of platform movement: pitch and roll. Pitch refers to movement that causes the platform 14 to pivot about the coupling 15 such that the front 19a moves up while the back 19b moves down, and vice versa, as shown in respective FIGS. 8a–8b. To pitch the back 19b of the platform 14 down, the first and second cams 28, 30 would be rotated to the position shown in FIG. 9a. This causes the back 19b to be at its lowest point relative to the horizontal plane 17 of the coupling 15. Conversely, to pitch the back 19b of the platform 14 up, the first and second cams 28, 30 would be rotated to the position shown in FIG. 9b. This causes the back 19b to be at its highest point relative to the horizontal plane 17 of the coupling 15.

Figure 10A:
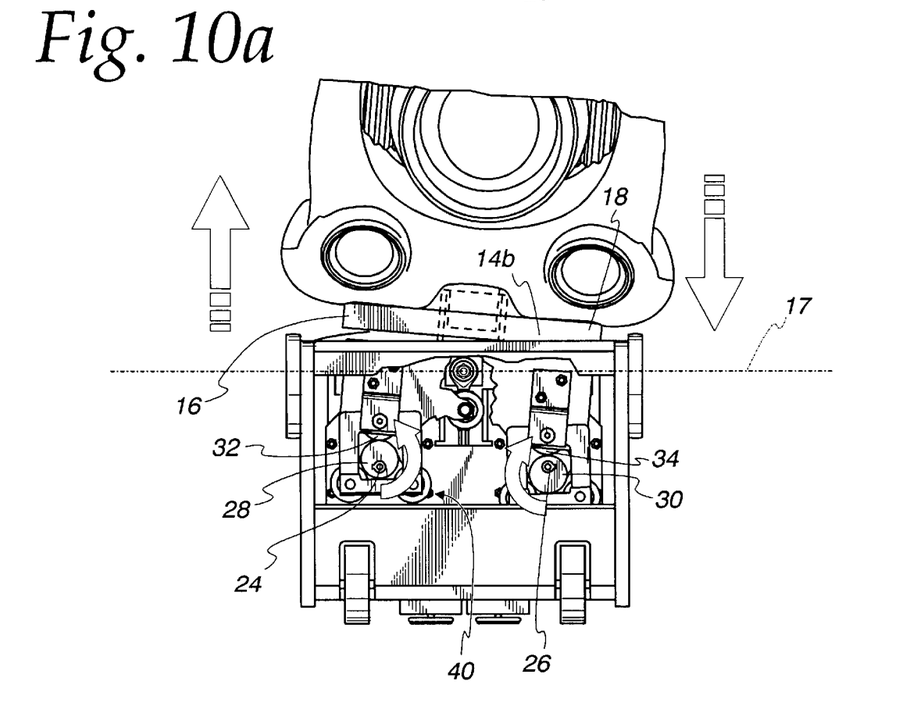
FIGS. 10a–10b are rear views of the motion simulator of FIG. 1 showing the platform in two different roll positions.
Figures 10B, 11B:
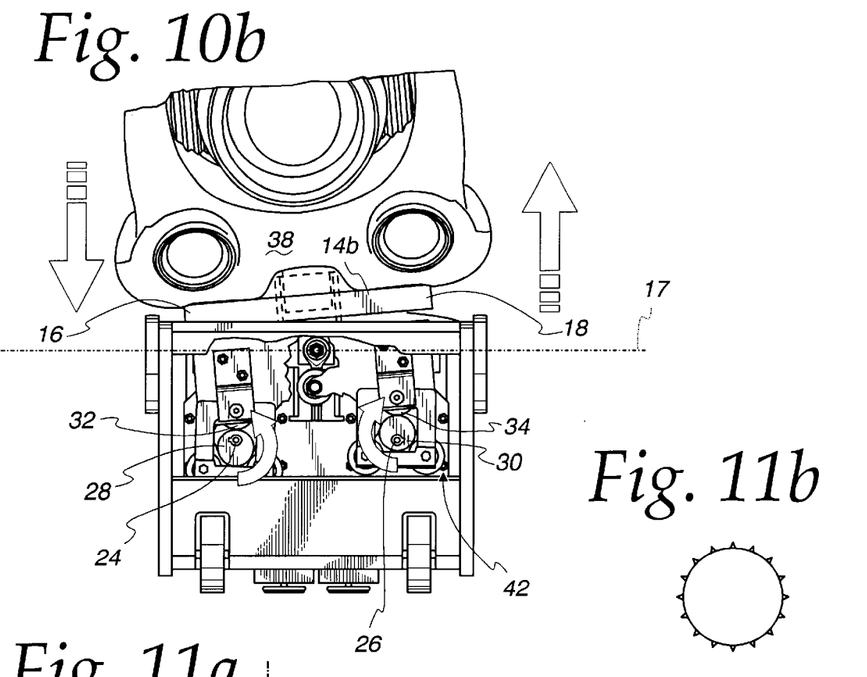
FIGS. 11a–11e are rear views of a profiled cam/cam follower arrangement for the motion simulator of FIG. 1.

Similarly, roll refers to movement that causes the platform 14 to pivot about the coupling 15 such that the first side 16 moves down while the second side 18 moves up, and vice versa, as shown in FIGS. 10a–b. To roll the first side 16 of the platform 14 up, the first and second cams 28, 30 would be rotated to the positions shown in FIG. 10a. This causes the first side 16 to be at its highest point which is above the horizontal plane 17 of the coupling 15. Conversely, to roll the second side 18 of the platform 14 up, the first and second cams 28, 30 would be rotated to the positions shown in FIG. 10b. This causes the second side 18 to be at its highest point which is above the horizontal plane 17 of the coupling 15. Thus, movement of only one of the cams 28, 30 imparts vertical movement to only the corresponding one of the cam followers 32, 34, thereby causing the platform 14 to roll with respect to the coupling 15. Movement of both cams 28, 30 imparts vertical movement to the respective cam followers 32, 34, thereby changing the pitch of the platform 14 with respect to the coupling 15. Accordingly, rotation of one or both of the cams is translated into linear motion of the cam followers which thereby move the platform 14 about its pivot point, the coupling 15.

In one embodiment, at least one of the first and second cam followers 32, 34 includes a profiled outer surface 35, as shown in FIG. 11a, such that rotation of the corresponding cam produces non-linear vertical movement of the platform 14. The profile on the first cam follower 32 shown in FIG. 11a includes a bumpy outer surface 35. Profiling one or both of the cam followers 32, 34 simulates, for example, a vehicle riding over different types of terrain such as asphalt, gravel, mud, water, etc. In still another embodiment, at least one of the first and second cams 28, 30 includes a profiled outer surface 31, as shown in FIG. 11a. For example, if the first cam 28 were profiled, rotation of first shaft 24 would impart angular rotation to eccentric, profiled cam 28 which would vertically move, in a non-linear fashion, the first cam follower 32, thus imparting non-linear vertical movement to the platform 14. The first cam 28 shown in FIG. 11a includes three profiles: a cut-out section, a smooth section, and a section of depressions, respectively. The profile on one or both of the cam followers and/or cams may include, without limitation, bumps, teeth, projections, depressions and/or cut-outs, as shown in FIGS. 11a–e, respectively.

In another embodiment, both the cam followers 32, 34 and the cams 28, 30 include profiled outer surfaces. In this embodiment, each surface may contain several profiles. For example, in one embodiment, the cam 28 includes three sections: a cut-out section, a smooth section, and a section of depressions. This allows the video game controller to alternate between two or more profiles on each cam to produce different types of platform movement to enhance the realism of the video game experience. For example, where the cams and the respective cam followers are profiled, the cam followers can simulate a vehicle's tires while the cam simulates the surface of a road.

In one embodiment, the motion simulator 10 is used in a driving game where a player can choose to race an off-road vehicle on an off-road, mountainous track. In this embodiment, the motion simulator 10 would be fitted with cam followers 32, 34 having a bumpy outer profile. The cams 28, 30 would each have an outer profile that includes a section of depressions, a smooth section and a cut-out section. Thus, the video game controller would alternate between the various sections of the profiled cam to produce different road surface effects. This allows different effects to be created by one cam without the need to physically change to a cam with a different profile. If, as in this embodiment, the cam has three profiles, the video game controller can limit rotation of the cam to one-third the circumference of the cam so that only one profile is used at a time. By using the smooth section of the cam in conjunction with the bumpy profile of the cam follower, the motion simulator 10 can simulate driving on a flat section of the track where the player only feels the rough ride of the knobby tires. By switching to the depressions section of the cam, the motion simulator 10 can simulate driving on a bumpy section of the track where the player feels both the rough ride from the knobby tires and the underlying bumpy surface. By switching to the cut-out section of the cam, the motion simulator 10 can simulate a vehicle landing after a jump, hitting a hole, skipping over waves, etc. Different effects can be created by combining different profiles on the cams and/or cam followers. Using a profiled cam follower resting on a profiled cam allows the motion simulator 10 to produce many different rates of acceleration and deceleration which can be used to create many different video game effects.

Figure 5:
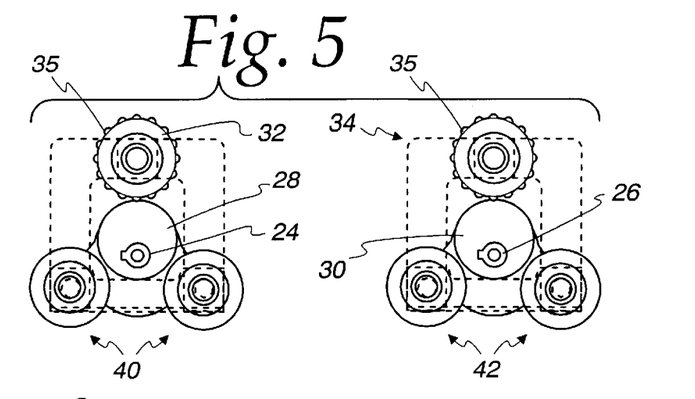
FIG. 5 is a rear view of a cam/cam follower arrangement for the motion simulator of FIG. 1.

In one embodiment, the motion simulator 10 includes a first pair of restraining members 40 and a second pair of restraining members 42, as shown in FIG. 5. The first pair of restraining members 40 help maintain the cam follower 32 resting on the cam 28. Similarly, the second pair of restraining members 42 help maintain the cam follower 34 resting on the cam 30. In this way, the abutting relationship between the first and second cam followers 32, 34 and the respective first and second cams 28, 30 is maintained despite relative motion between the cam/cam followers and despite the simulator 10 being moved, bumped, etc. In one embodiment, the first and second pairs of restraining members 40, 42 each comprise two rollers, as shown in FIG. 5. These rollers may be constructed similar to the cam followers (i.e., made from soft urethane rubber).

While the present invention has been described with reference to one or more embodiments, those skilled in the art will recognize that many changes may be made thereto without departing from the spirit and scope of the present invention which is set forth in the following claims.

What is claimed is:

1. A motion simulator for a video game comprising:
   a base;
   a platform supported on the base and having first and second sides;
   first and second motors driving respective first and second shafts;
   first and second cams mounted to the respective first and second shafts; and
   first and second cam followers connected to the platform proximate the respective first and second sides, the first and second cam followers resting on the respective first and second cams such that rotation of either the first or second shaft causes vertical movement of the platform.

2. The motion simulator of claim 1, further including a video display that is stationary relative to the platform.

3. The motion simulator of claim 1, wherein the platform includes a back, the first and second cam followers being connected to the back of the platform.

4. The motion simulator of claim 1, further including a seat mounted to the platform.

5. The motion simulator of claim 1, wherein the first and second cam followers comprise respective first and second rollers.

6. The motion simulator of claim 1, wherein at least one of the first and second cam followers has one or more profiled portions on its outer surface such that the vertical movement of the platform is non-linear.

7. The motion simulator of claim 6, wherein the profiled portions are selected from a group consisting of teeth, bumps, projections, depressions and cut-outs.

8. The motion simulator of claim 1, wherein at least one of the first and second cams has one or more profiled portions on its outer surface such that the vertical movement of the platform is non-linear.

9. The motion simulator of claim 8, wherein the profiled portions are selected from a group consisting of teeth, bumps, projections, depressions and cut-outs.

10. The motion simulator of claim 1, further including first and second pairs of restraining members for maintaining the respective first and second cam followers resting on the respective first and second cams.

11. The motion simulator of claim 10, wherein the first and second pairs of restraining members each comprise two rollers.

12. The motion simulator of claim 1, wherein the first and second cams are eccentric cams.

13. The motion simulator of claim 1, wherein the movable platform is pivotally supported on the base.

14. The motion simulator of claim 1, wherein the base includes a support member for pivotally supporting the base at a first location, and the cam followers are connected to the platform at a second location spaced from the first location.

15. A motion simulator for a video game comprising:
    a base;
    a movable platform supported on the base;
    a motor driving a shaft;
    a cam mounted to the shaft; and
    a cam follower connected to the platform and resting on the cam such that rotation of the shaft causes vertical movement of the platform.

16. The motion simulator of claim 15, wherein one of the cam and the cam follower has one or more profiled portions on its outer surface such that the vertical movement of the platform is non-linear.

17. The motion simulator of claim 16, wherein the one or more profiled portions are on the cam.

18. The motion simulator of claim 16, wherein the one or more profiled portions are on the cam follower.

19. The motion simulator of claim 16, wherein the one or more profiled portions are selected from a group consisting of teeth, bumps, projections, depressions and cut-outs.

20. The motion simulator of claim 15, further including a video display that is stationary relative to the movable platform.

21. The motion simulator of claim 15, wherein the movable platform is pivotally supported on the base.

22. The motion simulator of claim 15, wherein the base includes a support member for pivotally supporting the base at a first location, and the cam follower is connected to the platform at a second location spaced from the first location.

23. The motion simulator of claim 15, further including a seat mounted to the platform.

24. The motion simulator of claim 15, wherein the platform includes a back, the cam follower being connected to the back of the platform.

25. The motion simulator of claim 15, wherein the cam is an eccentric cam.

26. A method of moving a video game seat comprising:
    providing a motion simulator including a base, a platform supported on the base and having first and second sides, first and second motors for driving respective first and second shafts, first and second cams mounted to the respective first and second shafts, and first and second cam followers connected to the platform proximate the respective first and second sides, the first and second cam followers resting on the respective first and second cams such that rotation of either the first or second shaft causes vertical movement of the platform;
    depicting an action on a video display; and
    rotating one or both of the first and second shafts to cause vertical movement of the platform to simulate the action on the video display.

27. The method of claim 26, wherein the step of providing a motion simulator includes providing a seat mounted to the platform.

28. The method of claim 26 wherein said step of depicting an action on a video display includes isolating the video display with respect to the platform.

29. The method of claim 26 wherein said step of rotating includes the step of engaging an outer cam follower surface of one of said first and second cam followers with one of said first and second cams such that the vertical movement of the platform is non-linear, said outer cam follower surface having one or more profiled portions.

30. The method of claim 29 wherein engaging an outer cam follower surface comprises engaging one or more profiled portions selected from a group consisting of teeth, bumps, projections, depressions, and cut-outs.

31. The method of claim 26 wherein said step of rotating includes the step of engaging an outer cam surface of one of said first and second cams with one of said first and second cam followers such that vertical movement of the platform is non-linear, said outer cam surface having one or more profiled portions.

32. The method of claim 31 wherein engaging an outer cam surface comprises engaging one or more profiled portions selected from a group consisting of teeth, bumps, projections, depressions, and cut-outs.

33. The method of claim 26 wherein said step of rotating includes the step of engaging an eccentric cam with a cam follower.

34. A motion simulator comprising:

a base;

a platform movable with respect to said base; and at least three connecting members between said platform and said base, one of said connecting members being a fixed connection mechanism, the other connecting members being at least first and second vertically movable connectors, at least one of said vertically movable connectors including a cam system.

35. The motion simulator of claim 34 wherein said first and second vertically movable connectors comprise cam systems including first and second cams and first and second cam followers.

36. The motion simulator of claim 35 wherein at least one of said first and second cams includes an outer surface having one or more cam profiles.

37. The motion simulator of claim 36 wherein said cam profiles are selected from the group consisting of teeth, bumps, projections, depressions, and cut-outs.

38. The motion simulator of claim 35 wherein at least one of said first and second cam followers includes an outer surface having one or more cam follower profiles.

39. The motion simulator of claim 38 wherein said cam follower profiles are selected from the group consisting of teeth, bumps, projections, depressions, and cut-outs.

40. The motion simulator of claim 34 wherein said fixed connection mechanism is selected from the group consisting of a servo coupling, a universal coupling, a ball and socket coupling, and a flexible coupling.

41. The motion simulator of claim 34 wherein said at least three connecting members are positioned so as to form a triangle.

42. The motion simulator of claim 41 wherein said triangle is an isosceles triangle.

* * * * *